T. G. PLANT.
SHOE SOLE FLEXER.
APPLICATION FILED JUNE 23, 1909.

958,285.

Patented May 17, 1910.
5 SHEETS—SHEET 1.

Witnesses:
Rowell F. Hatch.
Redfield H. Allen.

Inventor
Thomas G. Plant
by Robt. P. Hains,
Att'y.

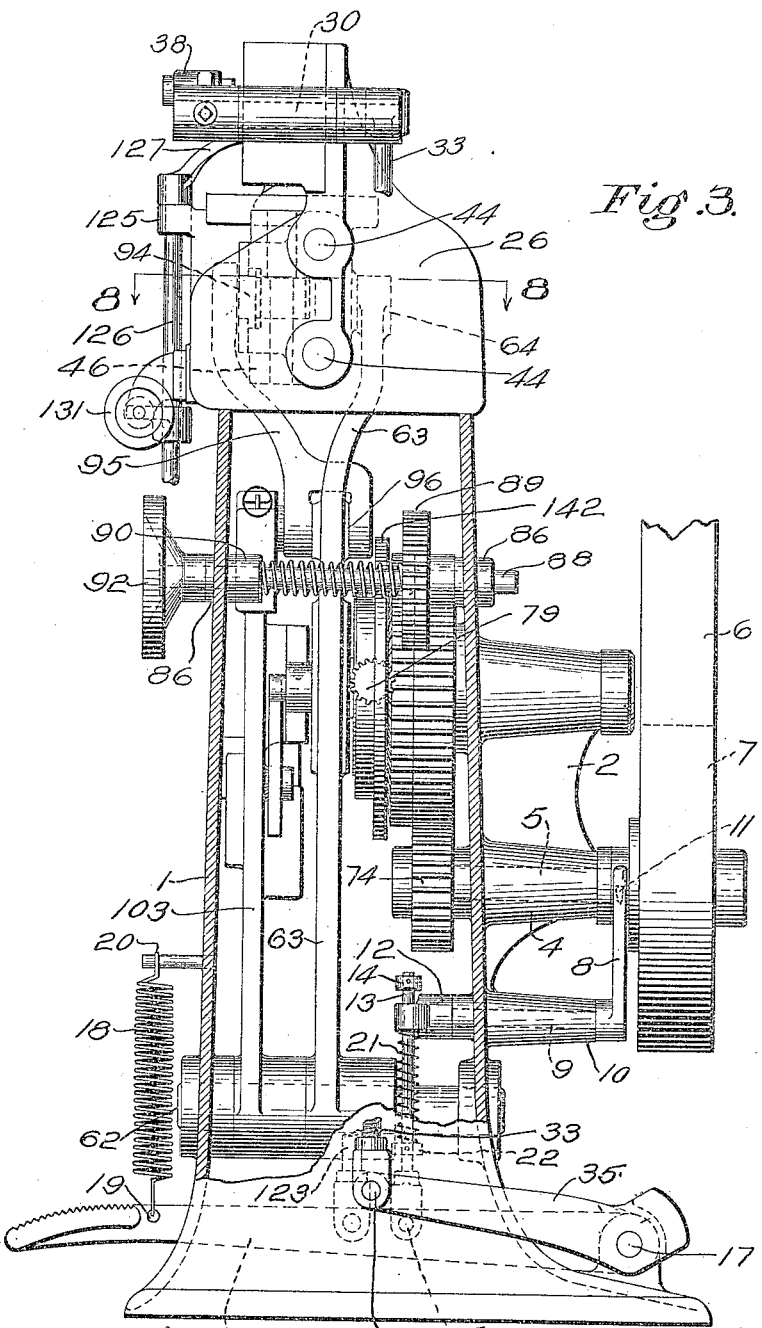

T. G. PLANT.
SHOE SOLE FLEXER.
APPLICATION FILED JUNE 23, 1909.
958,285.
Patented May 17, 1910.
5 SHEETS—SHEET 3.
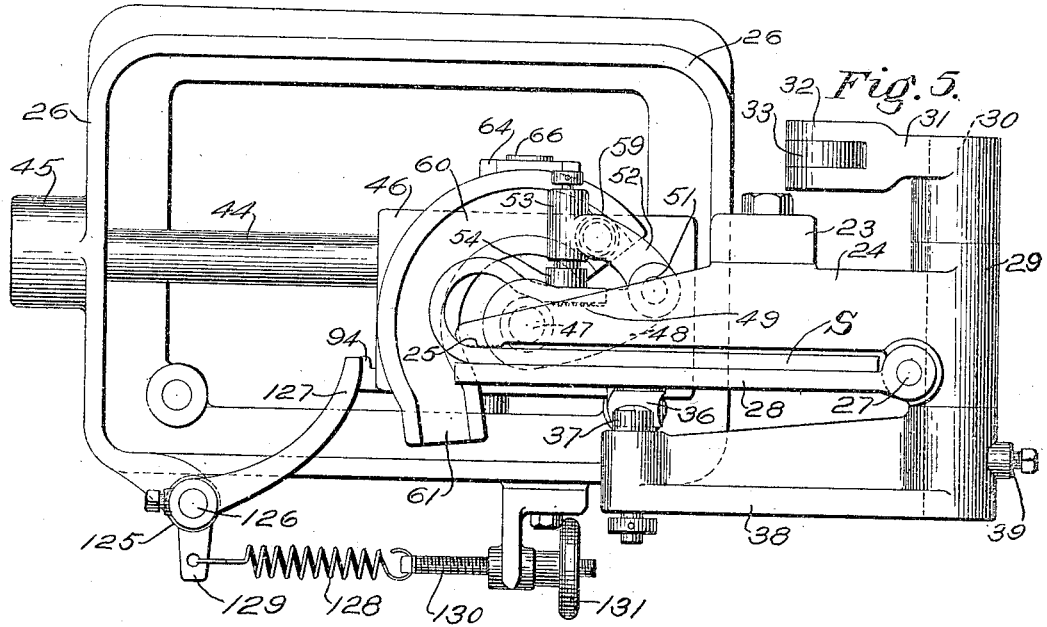
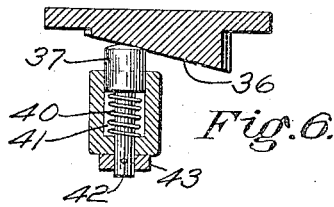
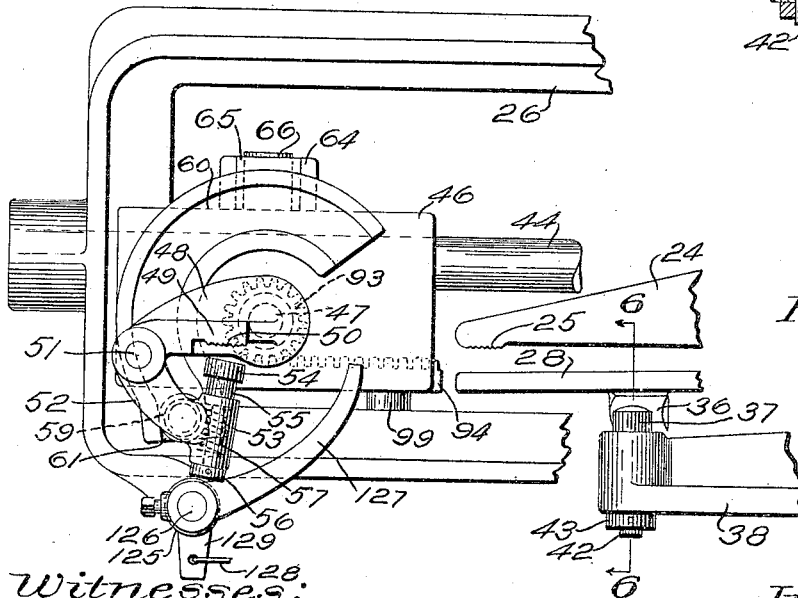
Witnesses:
Roswell F. Hatch.
Redfield H. Allen.
Inventor:
Thomas G. Plant
by Robt. P. Hains,
Atty.

T. G. PLANT.
SHOE SOLE FLEXER.
APPLICATION FILED JUNE 23, 1909.

958,285.

Patented May 17, 1910.

5 SHEETS—SHEET 4.

Witnesses:
Roswell F. Hatch.
Redfield H. Allen.

Inventor
Thomas G. Plant
by Robt. P. Hains.
Atty.

T. G. PLANT.
SHOE SOLE FLEXER.
APPLICATION FILED JUNE 23, 1909.
958,285.
Patented May 17, 1910.
5 SHEETS—SHEET 5.
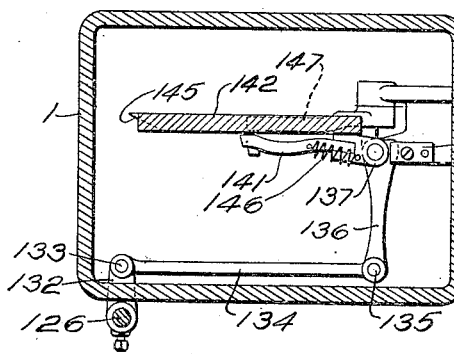
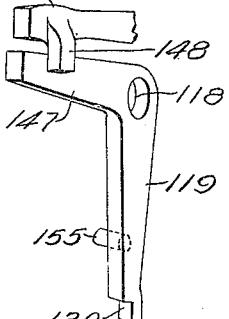
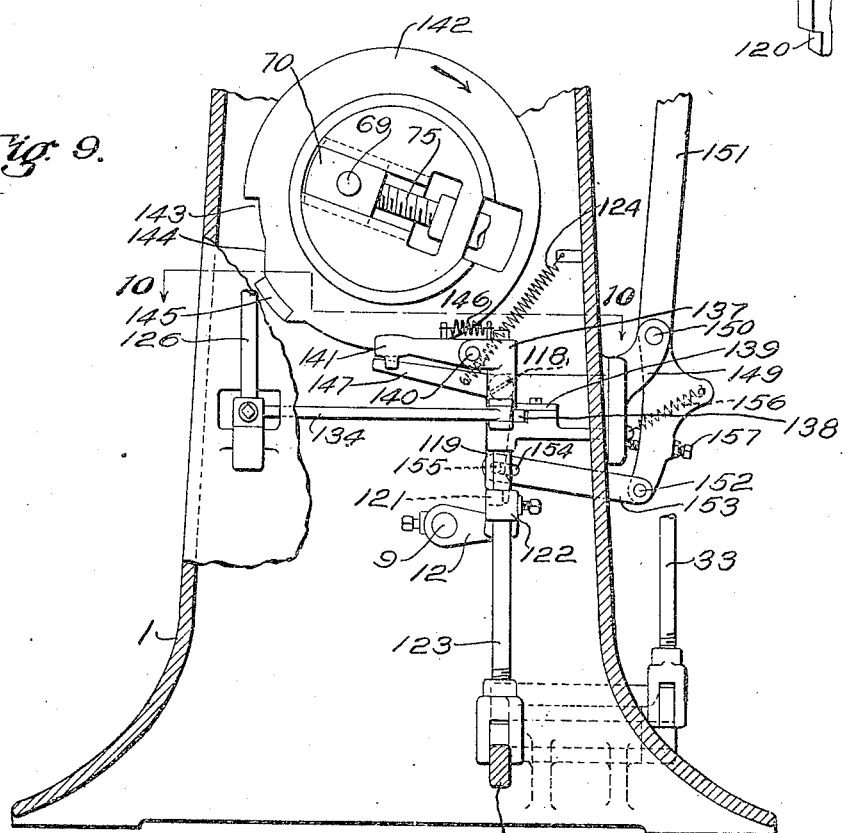
Witnesses:
Roswell F. Hatch
Redfield H. Allen
Inventor
Thomas G. Plant
By Rob't H. Hains Atty.

UNITED STATES PATENT OFFICE.

THOMAS G. PLANT, OF BOSTON, MASSACHUSETTS.

SHOE-SOLE FLEXER.

958,285.  Specification of Letters Patent.  Patented May 17, 1910.

Application filed June 23, 1909. Serial No. 503,793.

*To all whom it may concern:*

Be it known that I, THOMAS G. PLANT, a citizen of the United States, and a resident of Boston, in the county of Suffolk and State of Massachusetts, have invented an Improvement in Shoe-Sole Flexers, of which the following description, in connection with the accompanying drawings, is a specification, like characters on the drawings representing like parts.

The invention to be hereinafter described relates to shoe sole flexing machines designed to bend the sole, preferably the outsole, back and forth a number of times to impart to it a desirable flexibility which will be apparent in the finished shoe.

The aims and objects of the present invention are to provide a machine of the above general character which will impart to the sole of a shoe the desired flexibility, and will be simple in construction and efficient in operation. These aims and purposes of the invention, together with other objects thereof, will best be understood from the following description of one form of means for carrying the invention into practical effect, it being understood that the invention is not circumscribed by the details of the construction illustrated, but is generic in character, as pointed out by the claims.

Figures 1, 2:
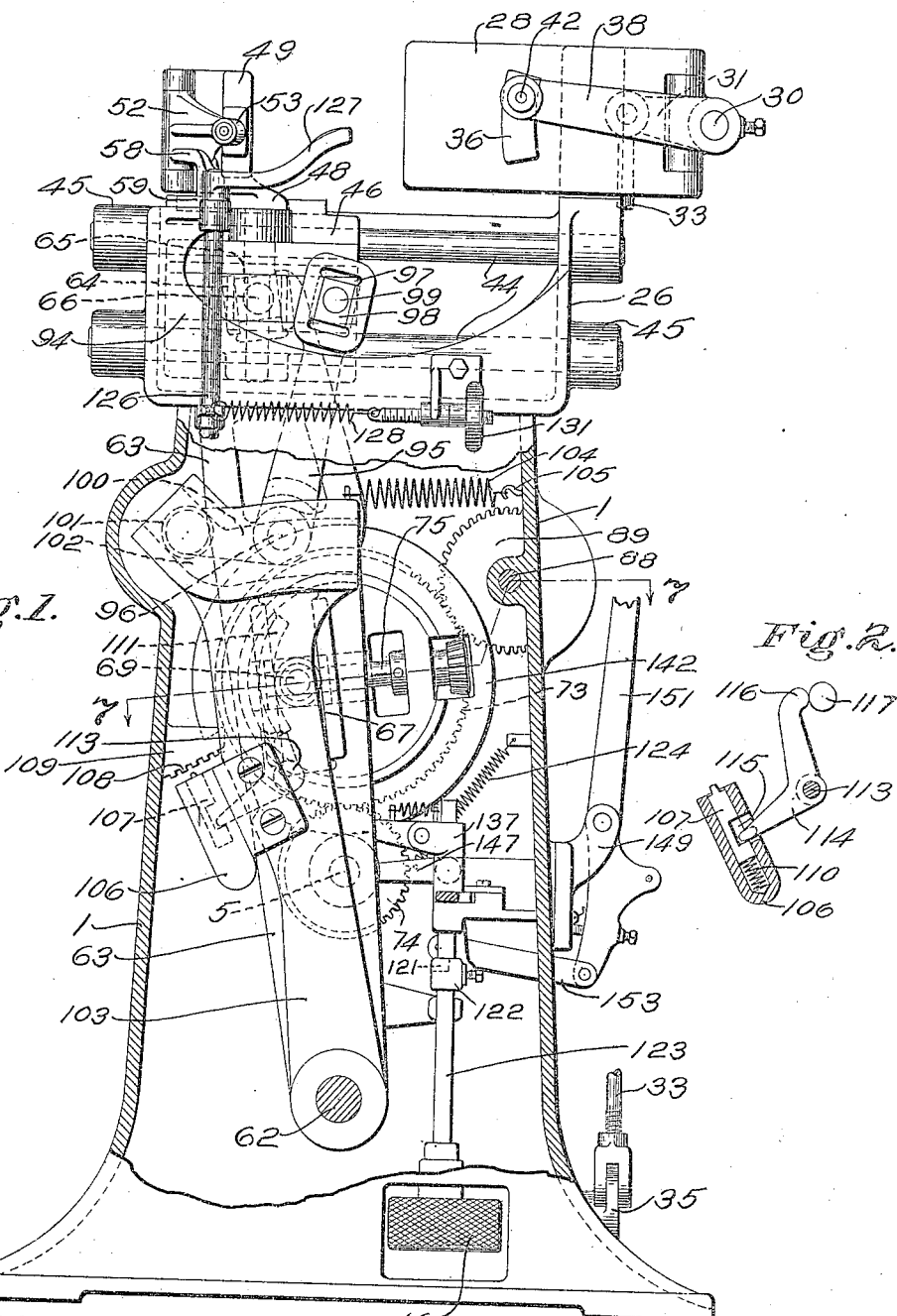
Figure 7:
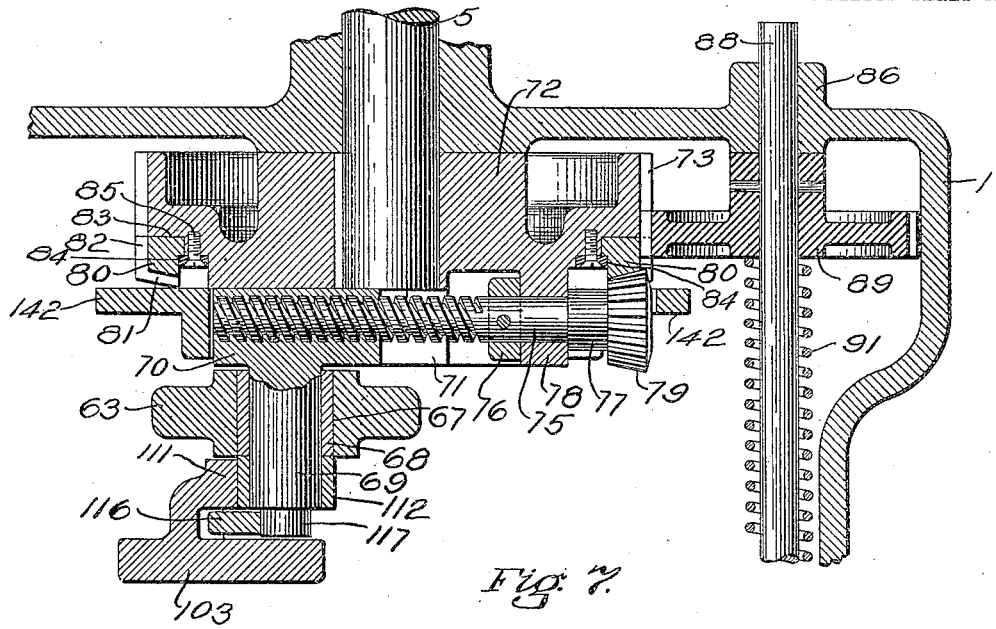
Figure 8:
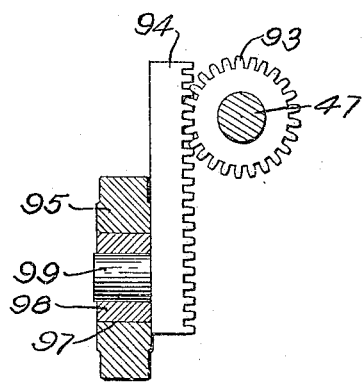

In the drawings: Figure 1 is a front elevation of the machine with part of the casing or column of the framework broken away to illustrate parts beyond; Fig. 2 is a detail showing the means for locking and unlocking the rack operating cam; Fig. 3 is a side elevation of the machine with part of the casing or framework broken out to illustrate parts beyond, and some of the parts being broken away to simplify the showing; Fig. 4 is a top or plan view, showing the means for holding or clamping the shoe sole for treatment by the machine, some of the parts being broken away to better show the construction; Fig. 5 is a view similar to that of Fig. 4, showing the sole in its flexed position as it is treated by the machine; Fig. 6 is a detail sectional view on the line 6—6 of Fig. 4, showing the means for operating the sole holding jaws; Fig. 7 is an enlarged sectional view on the line 7—7, Fig. 1; Fig. 8 is an enlarged sectional view on the line 8—8 of Fig. 3, showing the rack and its operating connections; Fig. 9 is an enlarged detail elevation of the lower portion of the machine illustrating more particularly the means for stopping the machine when the sole has been sufficiently flexed or treated; Fig. 10 is a section on line 10—10 of Fig. 9; and Fig. 11 is a detail showing the holding and trip arm of the stopping means.

The machine frame 1 comprises a suitable column supported upon a base and having a bracket 2, Fig. 3, providing a suitable bearing 4 for a driving shaft 5, Figs. 1, 3 and 5, carrying a loose pulley driven by a belt 6 from any usual or desired source of power. The pulley 7 is loose on the driving shaft 5 and is appropriately connected thereto at desired times by means of any suitable form of clutch, as, for instance, the well known "Horton" clutch which when the arm 8, carried by the rock shaft 9 held in a suitable bearing 10 extending from the column 1, is moved out of engagement with the stop 11, Fig. 3, the clutch will act to connect the driving pulley 7 and shaft 5 and, when the said arm 8 is moved to engage the stop 11 as it rotates with the shaft 5, it will disconnect the clutch members in the usual and well known manner, which need not be further herein described.

The shaft 9 has connected thereto an arm 12, Fig. 3, through the end of which is passed the treadle rod 13 surmounted by a fixed collar 14 and connected at its lower end at 15 to the treadle 16, which is itself pivotally connected to the lower portion of the machine frame on the rock shaft 17 and normally held in raised position by means of a spring 18, Fig. 3, one end of which is connected to the treadle at 19 and the other end to a pin 20, as will be readily understood from Fig. 3.

Surrounding the treadle rod 13 below the arm 12 is a spring 21, Fig. 3, the lower end of which rests upon a collar 22 fixed to the said rod 13, the construction being such that upon depression of the treadle by the foot there will be a certain amount of lost motion before the fixed collar 14 engages the top of the arm 12 to disengage the arm 8 and permit the clutch members to move into operative relation.

Before proceeding to describe in detail the particular means employed as the present form of the invention to actuate the elements which hold the sole to be flexed, it is well to refer to the sole holding and flexing means and thereafter lead attention to the operating devices therefor.

Mounted upon a suitable bracket arm 23,

Fig. 5, extending from the upper portion 26 of the framework is the fixed jaw arm 24 having at its outer end the teeth 25, if desired, to engage one surface of the sole S, Fig. 5. The fixed jaw arm 24 extends rearwardly and has pivotally connected thereto at 27 the movable sole holding jaw 28, it being understood that the sole S is designed to be placed between the jaws and held therebetween in a manner that will presently appear. The rear portion of the fixed jaw arm 24 furnishes a suitable bearing 29 for a rock shaft 30 carrying at one end the arm 31 having a bifurcated end portion 32 to which is pivotally connected the upper end of a rod 33, Figs. 3 and 5, connected at its lower end at 34, Fig. 3, to an arm 35 secured to and being movable with the treadle 16, said arm 35 being preferably fixed to the rock shaft 17 of the treadle 16, or otherwise so connected to said treadle as to move therewith.

The movable holding jaw 28, Fig. 5, has formed on or secured thereto the bevel or cam 36, Figs. 5 and 6, adapted to be engaged by the end of a plunger 37 mounted in an arm 38 secured by the set screw 39 to the shaft 30, so that upon depression of the treadle 16 the shaft 30 will be actuated and the plunger 37 will act upon the cam surface 36 to close the movable jaw firmly upon the sole S at the time between the jaws. In order that the action of the plunger 37 may be of a yielding nature, the plunger is held in the arm 38 by means of a socket 40, Fig. 6, a spring 41 being interposed between the plunger and the inner portion of the socket, as indicated in Fig. 6, and the stem 42 of the plunger being extended through the arm 38 and provided with a collar 43 fixed thereto, the construction being such that the plunger may be suitably held in the arm 38 and yet be permitted yielding movement with respect thereto.

The sole S being held between the fixed and movable jaws, substantially in the manner hereinbefore described, it is desirable that the toe portion of the sole S, an outsole, for instance, be flexed or bent, preferably so that its grain side may be convexed and its flesh side concaved, as indicated in Fig. 5. As one means of imparting this flexing action to the sole held between the fixed and movable holding jaws, the following construction is set forth as one embodiment of this feature of the invention, it being understood that the invention is not circumscribed by the details.

Extending between the upper side portions of the frame 26 are the guide rods 44, Figs. 1, 3, 4 and 5, said rods being suitably secured in bearings 45 and furnishing supports for a slide 46 having rotatably mounted therein the shaft 47 which therefore moves with said slide, as the latter is reciprocated back and forth on the guide rods 44 in a manner that will presently appear.

Secured to the upper portion of the shaft 47 is an arm 48 having a flexing jaw 49, preferably rigid therewith, said jaw being provided with teeth 50, if desired. Pivotally mounted at 51, Fig. 4, to the arm 48 is a link 52 carrying a sleeve 53 in which is yieldingly mounted the flexing jaw member 54. The flexing jaw member 54 may be of any desired construction suitable to its purpose, but is herein illustrated as comprising a plunger 55, the stem of which extends through the sleeve 53 and is provided with a fixed collar 56, Fig. 4, a spring 57 surrounding the stem 55 and normally impelling the flexing jaw member toward its coöperating jaw member 49, as will be readily understood. The link 52 has projecting downwardly therefrom the arm 58, Fig. 1, carrying a roll 59 adapted to engage and travel in the cam path 60 carried by the slide 46.

When the parts are in the position indicated in Fig. 4 ready to receive a sole to be flexed, the roll 59 is adjacent the outer straight portion 61 of the cam path 60, Figs. 4 and 5, the construction being such that should the shaft 47 mounted on the slide 46 be given rotative movement clockwise, looking at Fig. 4, its first action will be to cause the roll 59 to travel in the straight portion 61 of the cam path 60, thereby moving the flexing jaw member 54 into contact with the toe of a sole placed between it and its coöperating jaw 49, and if such movement of the shaft 47 be continued it will be apparent that the jaws 49 and 54 will be held in this clamping relation as the roll 49 travels in the concentric cam path 60. It will likewise be obvious that if the slide 46 be at this time moved to the right, Fig. 4, into the position indicated in Fig. 5, the sole, now held between the flexing jaws at one end and the holding jaws at the other end will be turned or flexed into the condition indicated in Fig. 5.

It will now be expedient to describe the means for imparting this sliding movement to the slide 46 and the rotative movement to the shaft 47.

Pivotally mounted on a stud shaft 62, Figs. 1 and 3, is a slide actuator 63, the upper end of which is bifurcated, as at 64, Figs. 1, 3 and 4, to engage a block 65 mounted upon a pin 66 projecting from the slide 46, the construction being such that upon oscillation of the slide actuator 63 about its pivotal mounting 62 the slide 46 will be moved back and forth on the guide rods 44, in a manner as will be readily understood.

The slide actuator 63 between its under portions is provided with a slot or ways 67, Figs. 1 and 7, in which slides a block 68 mounted on a crank pin 69, said crank pin being mounted upon a slide 70 movable in the ways 71 formed in the face of a driving gear 72, the teeth 73, Fig. 7, of said driving gear being in operative engagement with the teeth of a gear 74, Figs. 1 and 3, mounted on the driving shaft 5, the construction being such that upon rotation of the driving shaft the gear 72 will be suitably rotated and the crank pin 69 will impart to the slide actuator 63 its characteristic movements back and forth to actuate the slide in the manner already described.

Obviously soles are of different sizes and styles and vary in other respects, and to accommodate the present machine to the manipulation or flexing of various characters of soles it is desirable that the movement of the slide 46 be susceptible of variation. To this end the crank pin 69, as hereinbefore stated, is mounted upon a slide 70 movable in the ways 71 formed in the face of the gear 72, and as one means of moving the slide 70 in said ways the gear 72 carries the adjusting screw 75 which has screw-threaded engagement, Fig. 7, with the block 70, said adjusting screw 75 being provided with a sleeve 76 fixed thereto and a collar 77 between which is a bearing portion 78 of the gear 72, the construction being such that upon rotation of the adjusting screw 75 the slide 70, and perforce the crank pin 69, will be moved transversely of the gear 72 to thereby adjust the eccentricity of the crank pin, as will be readily understood. The adjusting screw 75, Fig. 7, is provided with a beveled gear 79 which meshes with the face teeth 81 of an adjusting gear 80, said adjusting gear 80 being also provided with peripheral teeth 82, Fig. 7, and rotatably mounted upon the gear 72. In the present instance the adjusting gear 80 is held to suitable ways 83 formed in the face of the gear 72 by means of a flange piece 84 overlying a shoulder of the adjusting gear and held in place by the screws 85, as will be readily apparent from Fig. 7, the construction being such that the adjusting gear 80 may be rotated independently of the gear 72 and by such rotation adjust the slide 70 through the adjusting screw 75.

Mounted in bearings 86, 86, Figs. 3 and 7, is a shaft 88 having fixed thereto a gear 89, the teeth of which are of sufficient length to engage the teeth of both the gear 72 and the adjusting gear 80, the construction being such that when the gear 89 is thus in operative relation with the teeth of the gear 72 and adjusting gear 80, said gears 72 and 80 will rotate in unison. Disposed between the gear 89 of the shaft 88 and a collar 90, Fig. 3, is a spring 91 which normally maintains the gear 89 with its teeth in mesh with the teeth of the gear 72 and adjusting gear 80, but upon movement of the shaft 88 to the left, Fig. 3, by force supplied to the hand wheel 92, Fig. 3, the gear 89 may be moved out of engagement with the gear 72 and still maintain its operative engagement with respect to the adjusting gear 80, and upon rotative movement of the shaft 88, under these conditions, the adjusting gear 80 may be independently rotated so as to adjust the crank pin 69 to the desired position in accordance with the amplitude of movement desired for the slide 46.

As one means of actuating the shaft 47 and causing the flexing jaw members to go into operative engagement with the sole, at the time of or just prior to the movement of the slide 46, the shaft 47, Fig. 4, is provided with teeth 93 which are engaged with the teeth of a slide rack 94 movable with relation to the slide 46.

As one means of actuating the slide rack 94 there is an arm 95, Figs. 1 and 3, pivotally mounted at 96 on the slide actuator 63 and having its upper portion provided with a slot 97 in which is movable a block 98 carried by a pin 99 projecting from the slide rack 94, the construction being such that upon actuation of the arm 95 the rack may be moved regardless of slide movement. The arm 95 has connected thereto another arm 100 carrying a roll 101 adapted to engage a cam path 102 formed in the upper portion of a cam carrying arm 103, Figs. 1 and 3.

From the construction described it will be apparent that, upon movement of the slide actuator 63, the cam path 102 being held stationary, the arm 95 will be moved to the left, Fig. 1, and actuate the slide rack 94, thereby bringing the flexing jaw members into coöperative relation with the shoe sole and that, upon further turning action of the shaft 47 due to the cam path 102 and its engaging roll 101, the flexing jaw members will be moved from the position indicated in Fig. 4 to that indicated in Fig. 5, the slide 46, in the meantime, moving toward the right. Thus as the slide 46 moves to the right, Figs. 4 and 5, the flexing jaw members 49 and 54 will flex or turn the sole S in the manner indicated in Fig. 5. Since the cam path 102 is to remain stationary while the slide 46 and the slide rack 94 are moving in the manner hereinbefore explained, and as the cam path 102 is unvarying in its character, it follows that for different movements of the slide 46 and the slide rack 94 the cam path 102 should be properly adjusted to accord therewith. As one means of carrying this feature of the invention into effect, the cam carrying slide 103 has connected thereto near its upper portion one end of a spring 104, the other end of which is connected at 105, Fig. 1, to the column 1, the normal tendency of said spring being to move the upper end of the cam carrying arm 103 to the right, Fig. 1. The cam carrying arm 103 carries a bracket 106, Fig. 1, supporting a plunger 107, Figs. 1 and 2, said plunger being normally pressed into operative engagement with the teeth 108, Fig. 1, carried by a bracket 109, by means of a spring 110, Fig. 2, in order to hold the cam carrying slide in fixed position at the beginning and during the slide and rack movements.

The cam carrying arm 103 has a portion 111, Figs. 1 and 7, which bears against a roll 112 carried by the crank pin 69, so that when free to move under the demand of the spring 104 the cam carrying arm will move to a position with its part 111 contacting with the roll 112. Mounted at 113 on the cam carrying arm 103 is a trip 114, the end of which engages the catch or plunger 107, as indicated at 115, Fig. 2, and the upper end 116 of this trip bears against the end 117 of the crank pin, the construction being such that when the crank pin 69 is in its position to the left, Fig. 1, prior to starting the machine into operation, the end of the crank pin will contact with the end 116 of the trip 114 and withdraw the plunger 107 from locking engagement with the teeth 108, so that the cam carrying arm 103, under the demand of the spring 104, may move into position with its part 111 contacting with the roll 112 carried by the crank pin and thus be in position corresponding to the starting adjustment of the crank pin for the character of work to be done.

From the construction thus far described it will be apparent that while the cam carrying arm is thus free to adjust itself with respect to the position of the crank pin and consequently to the travel of the slide and rack corresponding to the adjustment of the crank pin, the said cam carrying arm will, as the machine starts into operation and the end 117 of the crank pin moves from engagement with the trip 114, be locked in position during the travel of the slide and rack, and, as the slide and rack again approach the initial position, the end of the crank pin will operate the trip and again free the cam carrying arm so that it may adjust itself to the position of the crank pin.

As hereinbefore indicated, it is the purpose of the present invention to properly flex and render flexible the sole of a shoe, preferably the outsole, and to effect this purpose several bendings back and forth of the sole may be desirable. To effect this, notwithstanding the treadle may be released, there is pivoted to the frame or column 1 at 118 a bell crank lever, one arm 119 of which has a shouldered portion 120, Figs. 9 and 11, adapted to engage a lug 121 carried by an adjustable collar 122 secured to the rod 123 which is itself pivotally connected at its lower end to the treadle 16, said bell crank lever being under the influence of a spring 124, Fig. 9, which normally tends to hold the shoulder 120 of the bell crank into locking engagement with the lug or projection 121 to thereby hold the treadle depressed and thus enable the machine to continue in operation. It is likewise desirable in a machine of this character that after the sole has been sufficiently flexed or made flexible the machine be stopped and as one embodiment of this feature of the invention the following means is employed.

Rotatably mounted in suitable bearings 125 in the machine frame is a rock shaft 126 carrying at its upper portion a feeler 127, Figs. 1, 4 and 5, said feeler being normally turned into feeling relation with the sole held between the holding and flexing jaws by means of a spring 128, one end of which is connected to a lug 129 projecting from said rock shaft 126 and the other end of which is connected to an adjusting screw 130 having a hand wheel 131, whereby the tension of the spring may be varied.

At its lower end the rock shaft 126 has connected thereto an arm 132, Fig. 10, to which is jointed at 133 a link 134, the opposite end of which is jointed at 135, Fig. 10, to an arm 136 carried by a sleeve 137 loosely mounted on the treadle rod 123, said sleeve having a shouldered portion 138 engaging under a plate 139 to maintain the sleeve from longitudinal movement as the treadle rod 123 is raised and lowered. At its upper portion the sleeve 137 has pivotally connected thereto at 140, Fig. 9, a cam follower 141 which is normally pressed against the face portion of the cam 142 by means of the spring 128, Fig. 5, hereinbefore described. So long as the cam follower 141 bears against the plane face of the cam 142, the feeler 127 will be maintained out of feeling relation with respect to the sole being treated, and to enable the feeler 127 to assume feeling relation with respect to the sole as the flexing jaws move into initial position, the cam 142 has a portion 143 removed and an incline 144 leading to the peripheral portion of the cam and another incline 145, Figs. 9 and 10, leading to the side of said cam, the construction being such that as the cam 142 rotates in the direction of the arrow, Fig. 9, and the portion 143 comes opposite the cam follower 141, the latter will be free to move sidewise under the impulse of the spring 128 and the feeler 127 moves against the sole being treated, which, at this time, has been straightened or substantially straightened between the holding and flexing jaws. Should the sole prove to be sufficiently stiff to hold the feeler 127 from movement under the impulse of its spring 128, the cam follower 141 will not be moved sidewise as the portion 143 of the cam 142 comes opposite thereto, but, should the sole prove to be sufficiently flexible, the feeler 127 will move under the impulse of its spring 128, carry the cam follower 141 into the portion 143 of the cam 142 and, as the rising portion 144 of said cam passes over the top of the cam follower 141, it will depress the cam follower against the tension of its holding spring 146, Fig. 9, its end portion engaging the arm 147 of the bell crank pivoted at 118, thereby disengaging the shouldered portion 120 from the lug 121 and freeing the treadle 16 to move in response to its spring 18 and cause the machine to come to rest. As the machine continues to move for some little distance after the treadle has been released, the incline 145 thereof returns the cam follower to the initial position. The cam follower is provided with a projecting lug 148 so that its sidewise movement under the demand of the spring 128 will not carry it out of operative relation above the arm 147 of the bell crank, as will be readily understood.

From the construction thus far described it will be apparent that the machine will continue to operate after the treadle has once been depressed until the feeler 127 detects sufficient flexibility of the sole to permit it to move in response to its spring 128, and since this spring is adjustable, it is readily apparent that the flexible character of the sole being treated by the machine may be made as desired.

It is sometimes desirable that the machine be stopped by hand, and to this end there is pivoted to a bracket 149, Fig. 9, at 150 a hand lever 151, the lower portion of which is connected at 152 to a link 153, the end of which is provided with an elongated slot 154 which embraces a pin 155 projecting from one side of the bell crank, a spring 156 normally holding the parts in position indicated in Fig. 9 with the end of the adjusting screw 157 bearing against the bracket 149 and the pin 155 in the outer end of the slot 154 so that while the shouldered portion 120 of the bell crank may be readily disengaged from the lug 121 by movement of the hand lever 151, the slot 154 permits movement of the bell crank to free the treadle without operation of the hand lever, as will be readily understood.

It will be apparent to one skilled in the art that various changes and modifications may be made in the form and general arrangement of the parts, and that the invention is not restricted to the details shown and described, but is definitely set forth in the claims, applicant believing himself to be the first to provide a machine of this general character wherein the results hereinbefore enumerated are secured.

What is claimed is:

1. A shoe sole flexing machine, comprising, in combination, means for holding the sole while being treated, and means for rolling or bending an end portion of the sole back and forth toward and away from the plane of the sole body to impart flexibility thereto while so held.

2. A shoe sole flexing machine, comprising, in combination, means for holding the sole while being treated, means for grasping an end portion of the sole, and devices for causing said grasping means to turn or bend the sole end toward and away from the plane of the sole body while held by said means.

3. A shoe sole flexing machine, comprising, in combination, sole clamping means for holding the sole while being treated, and sole flexing means for rolling or bending the sole end toward and from the plane of the sole body while held by the clamping means to impart flexibility thereto.

4. A shoe sole flexing machine, comprising, in combination, sole holding jaws for holding a shoe sole while being treated, sole flexing jaws for engaging an end portion of the sole, and means for giving a relative bending movement to the holding and flexing jaws to cause the end of the sole to be bent toward and from the plane of the sole body to impart flexibility to the sole.

5. A shoe sole flexing machine, comprising, in combination, sole holding jaws for holding a shoe sole while being treated, sole flexing jaws for engaging a portion of the sole, and means for causing said flexing jaws to roll or bend the portion of the sole extending between the holding and flexing jaws toward and from the sole body to impart flexibility to the sole.

6. A shoe sole flexing machine, comprising, in combination, sole holding jaws for holding a shoe sole while being treated, sole flexing jaws for engaging a portion of the sole, and means for causing said flexing jaws to first engage a portion of the sole and then to roll or bend the portion of the sole extending between the holding and flexing jaws to impart flexibility to the sole.

7. A shoe sole flexing machine, comprising, in combination, means for engaging one portion of the sole, means for engaging another portion of the sole, and means for relatively turning the first two mentioned means toward and from each other to bend the sole extending between them and impart flexibility thereto.

8. In a sole flexing machine, the combination of means for holding a sole while it is being treated, means for engaging a portion of the sole not held by said first named means, a slide carrying said engaging means, and means for moving the slide and simultaneously turning said engaging means to roll or bend the sole and impart flexibility thereto.

9. A shoe sole flexing machine, comprising, in combination, means for engaging one portion of the sole, means for engaging another portion of the sole, and means for relatively moving the first two mentioned means toward and from each other and simultaneously turning one of said two means to roll or bend the sole end toward and from the plane of the sole body extending between them and impart flexibility thereto.

10. A shoe sole flexing machine, comprising, in combination, means for engaging one portion of the sole, means for engaging another portion of the sole, means for relatively moving the first two mentioned means to roll or bend the sole extending between them and impart flexibility thereto, and mechanism to stop the relative movement of said first two mentioned means when the sole has been sufficiently flexed.

11. A shoe sole flexing machine, comprising, in combination, means for engaging one portion of the sole, means for engaging another portion of the sole, means for relatively moving the first two mentioned means to roll or bend the sole extending between them and impart flexibility thereto, a feeler to detect the flexible condition of said sole, and means rendered operative through said feeler to stop the relative movement of said first two mentioned means when the sole has been rendered sufficiently flexible.

12. A shoe sole flexing machine, comprising, in combination, means for engaging one portion of the sole, means for engaging another portion of the sole, means for relatively moving the first two mentioned means to roll or bend the sole extending between them and impart flexibility thereto, a feeler to feel for the sole as said first two mentioned means return to relative initial positions to detect the flexible condition of the sole, and means actuated through the feeler to stop the machine when the sole has been sufficiently flexed.

13. A shoe sole flexing machine, comprising, in combination, means for holding the sole while being treated, means for rolling or bending an end portion of the sole back and forth to impart flexibility thereto while so held, and means operative to stop the machine when the sole has been rendered sufficiently flexible.

14. A shoe sole flexing machine, comprising, in combination, means for holding the sole while being treated, means for grasping an end portion of the sole, devices for causing said grasping means to roll or bend the sole while held by said means, and means acting upon the sole to detect its flexibility and stop the machine when the sole has been rendered sufficiently flexible.

15. In a sole flexing machine, the combination of sole flexing means and operating devices therefor, and means to feel the sole to detect its flexible condition and stop the machine when the sole has been rendered sufficiently flexible.

16. In a sole flexing machine, the combination of sole holding jaws, sole flexing jaws, and means for causing the flexing jaws to engage the sole and move toward and from the holding jaws and to be turned to flex or bend the sole as said flexing jaws are so moved.

17. In a sole flexing machine, the combination of means for holding a sole while being treated, sole flexing jaws to engage a portion of the sole, and means to cause said flexing jaws to be first clamped upon the sole, and then to simultaneously turn and move toward the said sole holding means.

18. In a sole flexing machine, the combination of means for holding a sole while being treated, sole flexing jaws to engage a portion of the sole, a slide on which said flexing jaws are mounted, means to clamp the flexing jaws upon the sole, and means acting thereafter to move the slide and carry the flexing jaws toward the sole holding means.

19. In a sole flexing machine, the combination of holding jaws and flexing jaws adapted to engage different portions of a shoe sole, means to cause the flexing jaws to clamp the sole between them and to then turn and move toward the holding jaws, and means for adjusting the action of the flexing jaws to suit shoe soles of different sizes.

20. In a shoe sole flexing machine, the combination of means for holding the sole while being treated, bending means for bending the sole back and forth to impart flexibility thereto, and means for operating the holding and bending means.

21. In a shoe sole flexing machine, the combination of means for engaging one portion of a shoe sole, means for engaging another portion of said sole, and means to cause the said first two mentioned means to engage the sole and bend it to impart flexibility thereto.

22. In a shoe sole flexing machine, the combination of means for engaging one portion of a shoe sole, means for engaging another portion of said sole, operating mechanism to cause said means to engage the sole and bend it, and a treadle for controlling said operating mechanism.

23. In a shoe sole flexing machine, the combination of means for engaging and bending a shoe sole to impart flexibility thereto, operating devices for said means, and means for controlling said operating devices.

24. In a shoe sole flexing machine, the combination of a shaft and driving devices therefor, means for engaging and bending a shoe sole, connections between said means and the shaft, and means for causing the driving devices to operate the shaft.

25. In a shoe sole flexing machine, the combination of two pairs of jaws for engaging a shoe sole at different places, and operating means acting upon said pairs of jaws to cause them to engage the shoe sole and bend it to impart flexibility thereto.

26. In a shoe sole flexing machine, the combination of two pairs of jaws for engaging a shoe sole at different places, operating means acting upon said pairs of jaws to cause them to engage the shoe sole and bend it to impart flexibility thereto, and a treadle to control said operating means.

27. In a sole flexing machine, the combination of means for engaging and bending a shoe sole to impart flexibility thereto, power operating devices for said means, and mechanism for varying the action of the first named means to accommodate shoe soles of varying sizes.

In testimony whereof, I have signed my name to this specification, in the presence of two subscribing witnesses.

THOMAS G. PLANT.

Witnesses:
 EBEN VAN EVERA,
 AMELIA M. ROSS.